US012621606B2

(12) United States Patent
Chang et al.

(10) Patent No.: US 12,621,606 B2
(45) Date of Patent: May 5, 2026

(54) CONTROL SYSTEM AND CONTROL METHOD FOR SPEAKERS IN FIELD

(71) Applicant: Wistron Corporation, New Taipei City (TW)

(72) Inventors: Shou-Jung Chang, New Taipei City (TW); Chih-Ming Chen, New Taipei City (TW); Chun Cheng Li, New Taipei City (TW)

(73) Assignee: Wistron Corporation, New Taipei City (TW)

( * ) Notice: Subject to any disclaimer, the term of this patent is extended or adjusted under 35 U.S.C. 154(b) by 303 days.

(21) Appl. No.: 18/474,269

(22) Filed: Sep. 26, 2023

(65) Prior Publication Data

US 2025/0056157 A1 Feb. 13, 2025

(30) Foreign Application Priority Data

Aug. 7, 2023 (TW) ................................ 112129574

(51) Int. Cl.
*H04R 3/12* (2006.01)
*H04R 1/40* (2006.01)
*H04R 3/00* (2006.01)
*H04R 29/00* (2006.01)

(52) U.S. Cl.
CPC ............... *H04R 3/12* (2013.01); *H04R 1/403* (2013.01); *H04R 1/406* (2013.01); *H04R 3/005* (2013.01); *H04R 29/002* (2013.01); *H04R 2430/01* (2013.01)

(58) Field of Classification Search
CPC .......... H04S 7/301; H04S 7/302; H04R 27/00
USPC ............................ 381/58–59, 104, 103, 107
See application file for complete search history.

(56) References Cited

U.S. PATENT DOCUMENTS

| | | | | |
|---|---|---|---|---|
| 7,428,310 | B2 | 9/2008 | Park | |
| RE44,170 | E | 4/2013 | Park | |
| RE45,251 | E | 11/2014 | Park | |
| 8,880,205 | B2 * | 11/2014 | Chung | H04S 7/307 381/103 |
| 9,119,012 | B2 * | 8/2015 | Ikizyan | H04R 3/00 |
| 10,299,060 | B2 * | 5/2019 | Satheesh | H04S 7/305 |

(Continued)

FOREIGN PATENT DOCUMENTS

| | | |
|---|---|---|
| CN | 1514673 | 7/2004 |
| CN | 103718574 | 4/2014 |

(Continued)

*Primary Examiner* — Disler Paul
(74) *Attorney, Agent, or Firm* — JCIPRNET

(57) ABSTRACT

A control system and a control method for speakers in a field are provided. The control method includes: outputting an audio signal by a first speaker corresponding to a first output power and a second speaker corresponding to a second output power; measuring a first volume and a first time delay corresponding to the audio signal by a first microphone; performing a calculation of an optimization algorithm according to the first output power, the second output power, the first volume, and the first time delay to obtain a first recommended output power corresponding to the first speaker and a second recommended output power corresponding to the second speaker; and configuring the first output power according to the first recommended output power, and configuring the second output power according to the second recommended output power.

20 Claims, 4 Drawing Sheets

(56) References Cited

U.S. PATENT DOCUMENTS

| | | | | |
|---|---|---|---|---|
| 11,671,065 | B2 * | 6/2023 | Goff | H04R 29/007<br>381/58 |
| 11,792,573 | B2 * | 10/2023 | Laube | H04R 3/005<br>381/57 |
| 2004/0131207 | A1 | 7/2004 | Park | |
| 2007/0018953 | A1 * | 1/2007 | Kipersztok | G06F 16/3329<br>707/E17.067 |
| 2014/0294201 | A1 | 10/2014 | Johnson et al. | |

FOREIGN PATENT DOCUMENTS

| | | |
|---|---|---|
| CN | 106028226 | 10/2016 |
| TW | 201915432 | 4/2019 |

* cited by examiner

CONTROL SYSTEM AND CONTROL METHOD FOR SPEAKERS IN FIELD

CROSS-REFERENCE TO RELATED APPLICATION

This application claims the priority benefit of Taiwan application serial no. 112129574, filed on Aug. 7, 2023. The entirety of the above-mentioned patent application is hereby incorporated by reference herein and made a part of this specification.

BACKGROUND

Technical Field

The invention relates to a control technology of a speaker, and particularly relates to a control system and a control method for a speaker in a field.

Description of Related Art

Generally, a plurality of speakers are arranged in a large conference room, so that a voice of a speechmaker may be spread to various positions in the conference room. Since a distance between each listener and the speaker may be different, a volume heard by each listener may also be different. Accordingly, some listeners may not be able to hear or hear the speechmaker's voice clearly. Therefore, how to make each listener in the conference room having a similar experience when listening to the speechmaker is one of the important topics in this field.

SUMMARY

The invention is directed to a control system and a control method for a speaker in a field, in which by controlling the speaker, each listener in a conference room is adapted to hear a voice of a speechmaker at a moderate volume.

The invention provides a control system for a speaker in a field, which includes a first speaker, a second speaker, a first microphone and a controller. The first speaker corresponds to a first output power. The second speaker corresponds to a second output power. The controller is communicatively connected to the first speaker, the second speaker, and the first microphone. The controller is configured to output an audio signal by the first speaker and the second speaker, measure a first volume and a first time delay corresponding to the audio signal by the first microphone, perform a calculation of an optimization algorithm according to the first output power, the second output power, the first volume, and the first time delay to obtain a first recommended output power corresponding to the first speaker and a second recommended output power corresponding to the second speaker, and configure the first output power according to the first recommended output power and configure the second output power according to the second recommended output power.

In an embodiment of the invention, the optimization algorithm includes a dynamic causal Bayesian optimization algorithm.

In an embodiment of the invention, an objective function of the dynamic causal Bayesian optimization algorithm includes a mean square error of a reference volume and the first volume.

In an embodiment of the invention, the control system further includes a second microphone. The second microphone is communicatively connected to the controller, where the second microphone obtains a sound wave corresponding to a second volume. An objective function of the dynamic causal Bayesian optimization algorithm includes a mean square error of the second volume and the first volume.

In an embodiment of the invention, constraints of the dynamic causal Bayesian optimization algorithm include an upper limit and a lower limit of the first recommended output power and an upper limit and a lower limit of the second recommended output power.

In an embodiment of the invention, the first speaker outputs the audio signal at a first time point, and the first microphone receives the audio signal at a second time point. The controller is further configured to calculate a difference between the second time point and the first time point to obtain the first time delay.

In an embodiment of the invention, the controller is further configured to perform the calculation of the optimization algorithm according to the first output power, the second output power, the first volume and the first time delay to obtain a recommended time delay corresponding to the first speaker, calculate a propagation delay according to a distance between the first speaker and the first microphone, subtract the propagation delay from the recommended time delay to obtain a recommended output delay, and configure an output delay of the first speaker according to the recommended output delay.

In an embodiment of the invention, the controller is further configured to output a first audio signal by the first speaker and output a second audio signal by the second speaker, measure a first propagation time of the first audio signal from the first speaker to the first microphone by the first microphone, and measure a second propagation time of the second audio signal from the second speaker to the first microphone by the first microphone, generate first positioning information of the first microphone according to a first position of the first speaker, the first propagation time, a second position of the second speaker, and the second propagation time, and calculate the distance according to the first positioning information.

In an embodiment of the invention, the first microphone includes a first transceiver, and the controller is further configured to transmit at least one reference signal, receive the at least one reference signal through the first transceiver to measure a positioning parameter of the first microphone, and calculate the distance according to the positioning parameter.

In an embodiment of the invention, the controller is further configured to execute an ultra-wideband positioning method, an enhanced cell identification positioning method or a time difference of arrival measurement method according to the positioning parameter to generate positioning information of the first microphone; and calculating the distance according to the positioning information of the first microphone.

The invention provides a control method for a speaker in a field, which includes: outputting an audio signal by a first speaker corresponding to a first output power and a second speaker corresponding to a second output power; measuring a first volume and a first time delay corresponding to the audio signal by a first microphone; performing a calculation of an optimization algorithm according to the first output power, the second output power, the first volume, and the first time delay to obtain a first recommended output power corresponding to the first speaker and a second recommended output power corresponding to the second speaker;

and configuring the first output power according to the first recommended output power, and configuring the second output power according to the second recommended output power.

In an embodiment of the invention, the optimization algorithm includes a dynamic causal Bayesian optimization algorithm.

In an embodiment of the invention, an objective function of the dynamic causal Bayesian optimization algorithm includes a mean square error of a reference volume and the first volume.

In an embodiment of the invention, the control method further includes: obtaining a sound wave corresponding to a second volume by a second microphone. An objective function of the dynamic causal Bayesian optimization algorithm includes a mean square error of the second volume and the first volume.

In an embodiment of the invention, constraints of the dynamic causal Bayesian optimization algorithm include an upper limit and a lower limit of the first recommended output power and an upper limit and a lower limit of the second recommended output power.

In an embodiment of the invention, the first speaker outputs the audio signal at a first time point, and the first microphone receives the audio signal at a second time point. The control method further includes: calculating a difference between the second time point and the first time point to obtain the first time delay.

In an embodiment of the invention, the control method further includes: performing the calculation of the optimization algorithm according to the first output power, the second output power, the first volume and the first time delay to obtain a recommended time delay corresponding to the first speaker; calculating a propagation delay according to a distance between the first speaker and the first microphone; subtracting the propagation delay from the recommended time delay to obtain a recommended output delay; and configuring an output delay of the first speaker according to the recommended output delay.

In an embodiment of the invention, the control method further includes: outputting a first audio signal by the first speaker, and outputting a second audio signal by the second speaker; measuring a first propagation time of the first audio signal from the first speaker to the first microphone by the first microphone, and measuring a second propagation time of the second audio signal from the second speaker to the first microphone by the first microphone; generating first positioning information of the first microphone according to a first position of the first speaker, the first propagation time, a second position of the second speaker, and the second propagation time; and calculating the distance according to the first positioning information.

In an embodiment of the invention, the control method further includes: transmitting at least one reference signal; receiving the at least one reference signal by the first transceiver to measure a positioning parameter of the first microphone; and calculating the distance according to the positioning parameter.

In an embodiment of the invention, the control method further includes: executing an ultra-wideband positioning method, an enhanced cell identification positioning method or a time difference of arrival measurement method according to the positioning parameter to generate positioning information of the first microphone; and calculating the distance according to the positioning information of the first microphone.

Based on the above description, the control system of the invention may make the sound heard by each listener in the field to have a similar volume by configuring the output powers or output delays of the speakers.

DESCRIPTION OF THE EMBODIMENTS

Figure 1:
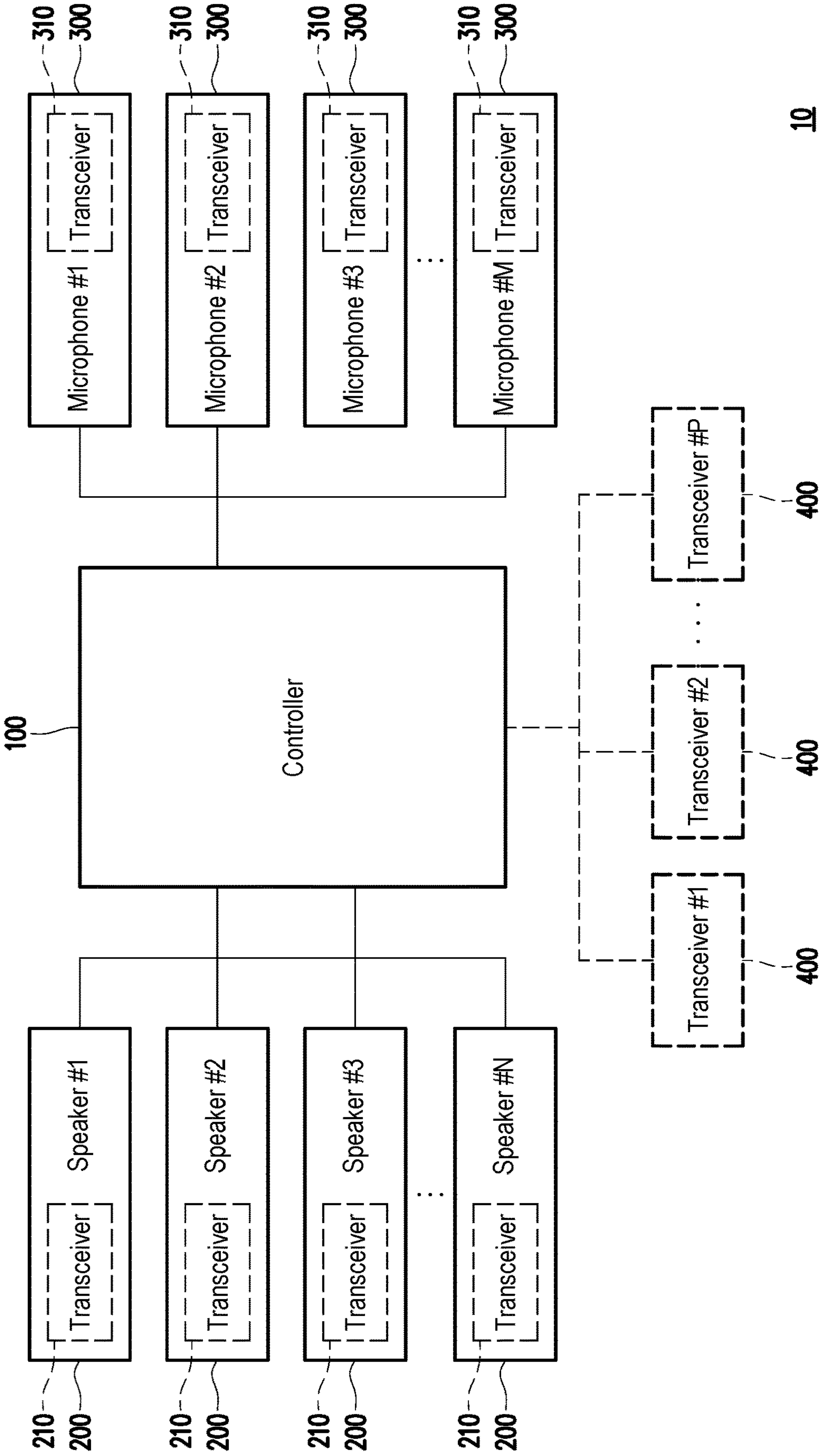
FIG. 1 is a schematic diagram of a control system for speakers in a field according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic diagram of a control system 10 for speakers in a field according to an embodiment of the invention. The control system 10 may include a controller 100 and N speakers 200, such as a speaker #1, a speaker #2, a speaker #3 or a speaker #N. N may be any positive integer greater than or equal to 2. In addition, the controller 10 may include M microphones 300, such as a microphone #1, a microphone #2, a microphone #3 or a microphone #M. M may be any positive integer. In an embodiment, the control system 10 may further include P transceivers 400, such as a transceiver #1, a transceiver #2 or a transceiver #P. P may be any positive integer. In an embodiment, the control system 10 may be implemented by a multimedia server or a cloud server.

The controller 100 is, for example, a central processing unit (CPU), or other programmable general purpose or special purpose micro control unit (MCU), microprocessor, digital signal processor (DSP), programmable controller, application specific integrated circuit (ASIC), graphics processing unit (GPU), image signal processor (ISP), image processing unit (IPU), arithmetic logic unit (ALU), complex programmable logic device (CPLD), field programmable gate array (FPGA) or other similar components or a combination of the above components. The controller 100 may be communicatively connected to the speaker 200, the microphone 300 or the transceiver 400.

The controller 100 may configure the speakers 200 so that the speakers 200 outputs audio signals according to output powers and output delays. The speaker 200 may be installed at various positions in a field (for example, a conference room). The microphones 300 are used to obtain or measure sound waves or the audio signals. The microphones 300 are, for example, portable devices or microphone devices held by conference participants, such as microphones, mobile phones, tablet computers or notebook computers, etc., in the conference room. In the embodiment, it is assumed that the microphone #1 (or referred to as a second microphone) is held by a speechmaker of a conference, and other microphones such as the microphone #2 (or referred to as a first microphone), the microphone #3 or the microphone #M are held by listeners of the conference. In an embodiment, the speakers 200 may include transceivers 210. The speakers 200 may transmit wireless signals to the transceivers 400 or receive wireless signals from the transceivers 400 through the transceivers 210.

The transceivers 400 may transmit and receive signals in a wireless or wired manner. Transceivers 400 may also perform operations such as low noise amplification, impedance matching, frequency mixing, up or down frequency conversion, filtering, amplification, etc. Communication protocol supported by the transceivers 400 may include but not limited to: an ultra-wideband (UWB) communication protocol, a global navigation satellite system (GNSS), a location management function (LMF) or a new radio positioning protocol annex (NRPPa).

In an embodiment, the microphones 300 may include transceivers 310. The microphones 300 may transmit wireless signals to the transceivers 400 or receive wireless signals from the transceivers 400 through the transceivers 310.

Figure 2:
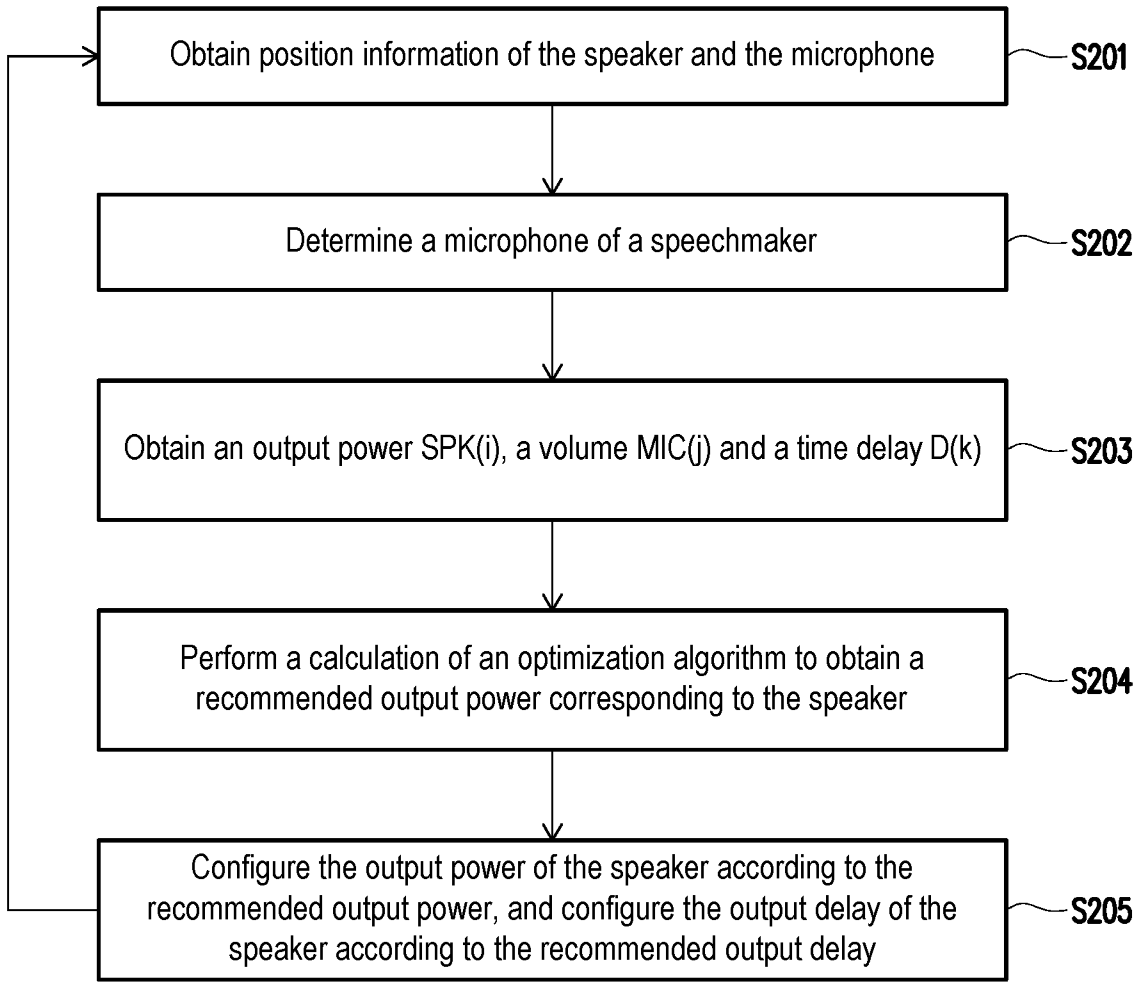
FIG. 2 is a flowchart of a control method for speakers in a field according to an embodiment of the invention.

FIG. 2 is a flowchart of a control method for speakers in a field according to an embodiment of the invention, where the control method may be implemented by the control system 10 shown in FIG. 1. In step S201, the controller 100 may obtain positioning information of each speaker 200 and positioning information of each microphone 300. The positioning information of the speakers 200 is, for example, coordinates of the speakers 200 in the field. The positioning information of the microphones 300 is, for example, coordinates of the microphones 300 in the field. Since the speakers in the field are usually set at fixed positions, position information of the speakers 200 is predefined. However, in some cases, the speakers 200 may also move in the field, so that the position information of the speakers 200 may also be changed dynamically. In order to obtain the positioning information of each speaker 200, the controller 100 may perform positioning on the speakers 200, and the speakers 200 transmit the positioning information to the controller 100 through the transceivers 210 accordingly. Namely, the controller 100 may obtain the positioning information of the speakers 200 from the speakers 200 through a wireless communication technology. On the other hand, since the listeners carrying the microphones 300 may probably move in the field, the positioning information of the microphones 300 may be changed dynamically. In order to obtain the positioning information of each microphone 300, the controller 100 may perform positioning on the microphones 300, and the microphones 300 correspondingly transmit the positioning information to the controller 100 through the transceivers 310. Namely, the controller 100 may obtain the positioning information of the microphones 300 from the microphones 300 through the wireless communication technology.

In an embodiment, the controller 100 may position the microphones 300 according to the audio signals output by the plurality of speakers 200, so as to obtain first positioning information of the microphones 300, where the first positioning information includes, for example, coordinates of the microphones 300 in the field. Specifically, the controller 100 may output a plurality of audio signals respectively corresponding to the plurality of speakers 200 through the plurality of speakers 200. The controller 100 may receive the audio signal output by each speaker 200 through the microphones 300, and measure a propagation time of the audio signal from each speaker 200 to the microphone 300. The controller 100 may generate the first positioning information of the microphone 300 according to the position of each speaker 200 and each propagation time.

Figure 3:
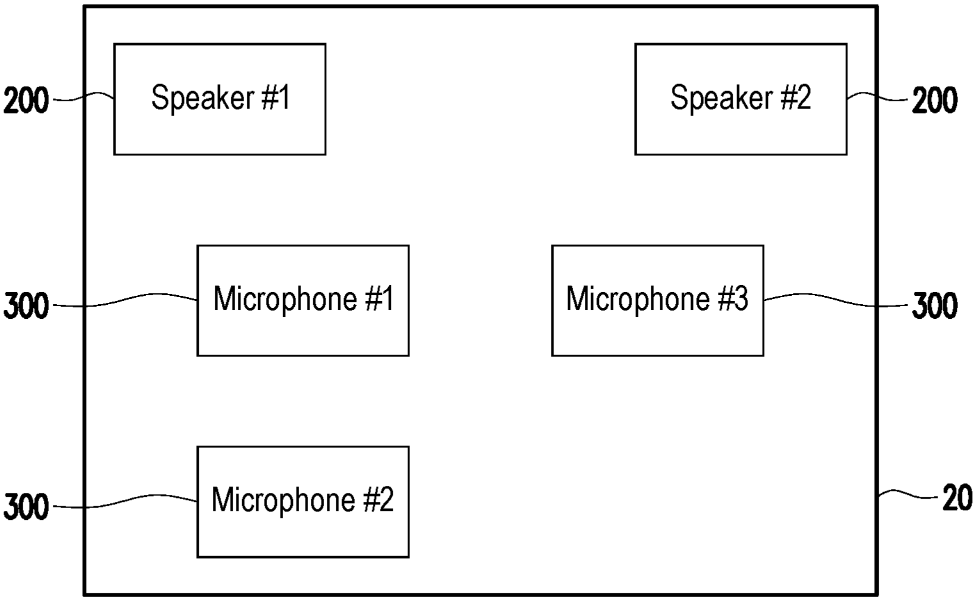
FIG. 3 is a schematic diagram illustrating a first scenario of the field according to an embodiment of the invention.

Taking FIG. 3 as an example, in order to obtain the positioning information of the microphone #2, the controller 100 may output a plurality of audio signals through the speaker #1 or the speaker #2, respectively. The controller 100 may receive the audio signal from the speaker #1 through the microphone #2, and measure the propagation time of the audio signal from the speaker #1 to the microphone #2. On the other hand, the controller 100 may receive the audio signal from the speaker #2 through the microphone #2, and measure the propagation time of the audio signal from the speaker #2 to the microphone #2. The controller 100 may generate the first positioning information of the microphone #2 according to the position of the speaker #1, the propagation time from the speaker #1 to the microphone #2, the position of the speaker #2, and the propagation time from the speaker #2 to the microphone #2, where the first positioning information includes, for example, coordinates of the microphone #2 in a field 20. The controller 100 may calculate a distance between the microphone 300 and the speaker 200 according to the first positioning information and the positioning information of the speaker 200.

In an embodiment, the controller 100 may position the microphones 300 according to electromagnetic wave signals output by the multiple transceivers 400 to obtain positioning parameters of the microphones 300, and calculate second positioning information (or third positioning information) according to the positioning parameters), where the second positioning information (or the third positioning information) includes, for example, coordinates of the microphones 300 in the field. Specifically, the controller 100 may output a plurality of reference signals respectively corresponding to the plurality of transceivers 400 through the plurality of transceivers 400. The controller 100 may receive the reference signals output by each transceiver 400 through the transceivers 310 of the microphones 300 to measure the positioning parameters of the microphones 300. The controller 100 may execute an ultra-wideband positioning method according to the positioning parameters to generate the second positioning information of the microphones 300. On the other hand, the controller 100 may perform an enhanced cell identification (E-CID) positioning method or an observed time difference on arrival (OTDOA) method according to the positioning parameters to generate the third positioning information of the microphones 300. The above positioning parameters may include but not limited to time of flight (TOF), two-way ranging, reference signal received power (RSRP), time of arrival (TOA), time difference of arrival (TDOA), time advance (TADV), round trip time (RTT) or angle-of-arrival (AoA). The controller 100 may calculate distances between the microphones 300 and the speakers 200 according to the second positioning information (or the third positioning information) and the positioning information of the speakers 200. In an embodiment, based on the same method as above, the controller 100 may position the speakers 200 according to the electromagnetic wave signals output by the multiple transceivers 400 to obtain the positioning parameters of the speakers 200, and calculate the positioning information of the speakers 200 according to the positioning parameters, where the positioning information of the speakers 200 includes, for example, the coordinates of the speakers 200 in the field.

In an embodiment, the controller 100 may calculate more accurate positioning information of the microphones 300 by comprehensively considering the first positioning information of the microphones 300 and the second positioning information (or third positioning information) generated according to the positioning parameters. For example, the controller 100 may perform data fusion, complementary positioning, hierarchical positioning, or a machine learning algorithm according to the first positioning information, the second positioning information, and the third positioning information to generate the more accurate positioning information of the microphones 300. The controller 100 may calculate the distances between the microphones 300 and the speakers 200 according to the positioning information of the microphones 300 and the positioning information of the speakers 200.

In step S202, the controller 100 may determine which one of the plurality of microphones 300 belongs to the microphone of the speechmaker (i.e.: the microphone #1).

In an embodiment, the controller 100 may determine which one of the plurality of microphones 300 is the microphone #1 according to a time point when each microphone 300 receives the audio signal. The microphone 300 that receives the audio signal first may be determined by the controller 100 as corresponding to the microphone #1 of the speechmaker. Taking FIG. 3 as an example, it is assumed that the microphone #1 belongs to the speechmaker, and the microphone #2 and the microphone #3 belong to the audience. When the speechmaker speaks at a first time point, the microphone #1 may receive a sound wave including the audio signal sent by the speechmaker, and the controller 100 may output the audio signal obtained by the microphone #1 through the speaker #1 or the speaker #2. Then, the microphone #2 may receive the sound wave sent by the speechmaker or the audio signal output from the speaker at a time point after the first time point, and the microphone #3 may receive the sound wave sent by the speechmaker or the audio signal output from the speaker at a time point after the first time point. Since the first time point when the microphone #1 receives the audio signal is earlier than the time point when the microphone #2 or the microphone #3 receives the audio signal, the controller 100 may determine that the microphone #1 corresponds to the speechmaker.

In an embodiment, the controller 100 may determine which one of the plurality of microphones 300 is the microphone #1 according to volumes (or sound pressures) of the audio signals received by the plurality of microphones 300, where a unit of the volume is decibel (dB), for example. The microphone 300 that receives the audio signal with the highest volume may be determined by the controller 100 as corresponding to the microphone #1 of the speechmaker. Taking FIG. 3 as an example, it is assumed that the microphone #1 belongs to the speechmaker, and the microphone #2 and the microphone #3 belong to the audience. When the speechmaker speaks, a distance between the speechmaker and the microphone #1 is relatively close, so that the sound wave including the audio signal received by the microphone #1 has a relatively large volume. On the other hand, since the speechmaker is far away from the microphone #2 or the microphone #3, the audio signal received by the microphone #2 or the microphone #3 has a relatively low volume. Accordingly, the controller 100 may determine that the microphone #1 corresponds to the speechmaker in response to the volume of the audio signal received by the microphone #1 being greater than the volume of the audio signal received by the microphone #2 or the microphone #3.

In step S203, the controller 100 may obtain an output power SPK(i) of each speaker 200, a volume MIC(j) of the audio signal received by each microphone 300, and a time delay D(k) of each microphone 300. The output power SPK(i) represents an output power of an $i^{th}$ speaker 200 (i.e.: the speaker #i) in the N speakers 200, and i=1–N. The volume MIC(j) represents a volume of a $j^{th}$ microphone 300 (i.e.: the microphone #j) in the M microphones 300, and j=1–M, where the index j=1 corresponds to the speechmaker (i.e.: the microphone #1), and the index j=2–M corresponds to the audience (i.e.: the microphone #2 to the microphone #M). The time delay D(k) represents a time delay of a $k^{th}$ microphone 300 (i.e. the microphone #k) in the M microphones 300, and k=2–M, where the index k=2–M corresponds to the audience. Specifically, the controller 100 may control each speaker 200 to output an audio signal according to a predefined output power, and may measure a volume or time delay corresponding to the audio signal received by the microphone 300 through each microphone 300. In an embodiment, the time delay D(k) may be a vector, and the time delay D(k) may include the time delay between the $k^{th}$ microphone 300 and each speaker 200. For example, the time delay D(k)–[D(k,1) D(k,2) . . . D(k,N)], where D(k,1) corresponds to the time delay between the $k^{th}$ microphone 300 and the 1st speaker 200, D(k,2) corresponds to the time delay between the $k^{th}$ microphone 300 and the 2nd speaker 200, and D(k,N) corresponds to the time delay between the $k^{th}$ microphone 300 and the Nth speaker 200.

In an embodiment, the time delay D(k) may include a difference between a time point when each speaker 200 outputs the audio signal and a time point when the microphone #k receives the audio signal (i.e.: a propagation delay between the speaker 200 and microphone #k). For example, the time delay D(k) may be a vector and D(k)=[D(k,1) D(k,2) . . . D(k,N)], where D(k,1) is the difference between the time point when the 1st speaker 200 outputs the audio signal and the time point when the $k^{th}$ microphone 300 receives the audio signal, D(k,2) is the difference between the time point when the 2nd speaker 200 outputs the audio signal and the time point when the $k^{th}$ microphone 300 receives the audio signal, and D(k,N) is the difference between the time point when the Nth speaker 200 outputs the audio signal and the time point when the $k^{th}$ microphone 300 receives the audio signal. Taking FIG. 3 as an example, FIG. 3 is a schematic diagram illustrating a first scenario of the field 20 according to an embodiment of the invention. In the first scenario, the speechmaker and the microphone #1 carried by the speechmaker are located in the field 20. When the speechmaker speaks, the microphone #1 may obtain the sound wave to transmit the audio signal corresponding to the sound wave to the controller 100, and the controller 100 may output the audio signal through the speaker #1 and the speaker #2 at a time point t1. The microphone #2 may receive the audio signal from the speaker #1 at a time point t2, and receive the audio signal from the speaker #2 at a time point t3. The controller 100 may calculate a difference between the time point t2 and the time point t1 (i.e.: t2–t1) and a difference between the time point t3 and the time point t1 (i.e.: t3–t1), so as to obtain the time delay D(2)=[D(2,1) D(2,2)] corresponding to the microphone #2, where D(2,1) represents the time delay between the microphone #2 and the speaker #1, and D(2,2) represents the time delay between the microphone #2 and the speaker #2. Based on the same method, the controller 100 may obtain the time delay D(3)=[D(3,1) D(3,2)] corresponding to the microphone #3, where D(3,1) represents the time delay between the microphone #3 and the speaker #1, and D(3,2) represents the time delay between the microphone #3 and the speaker #2.

Figure 4:
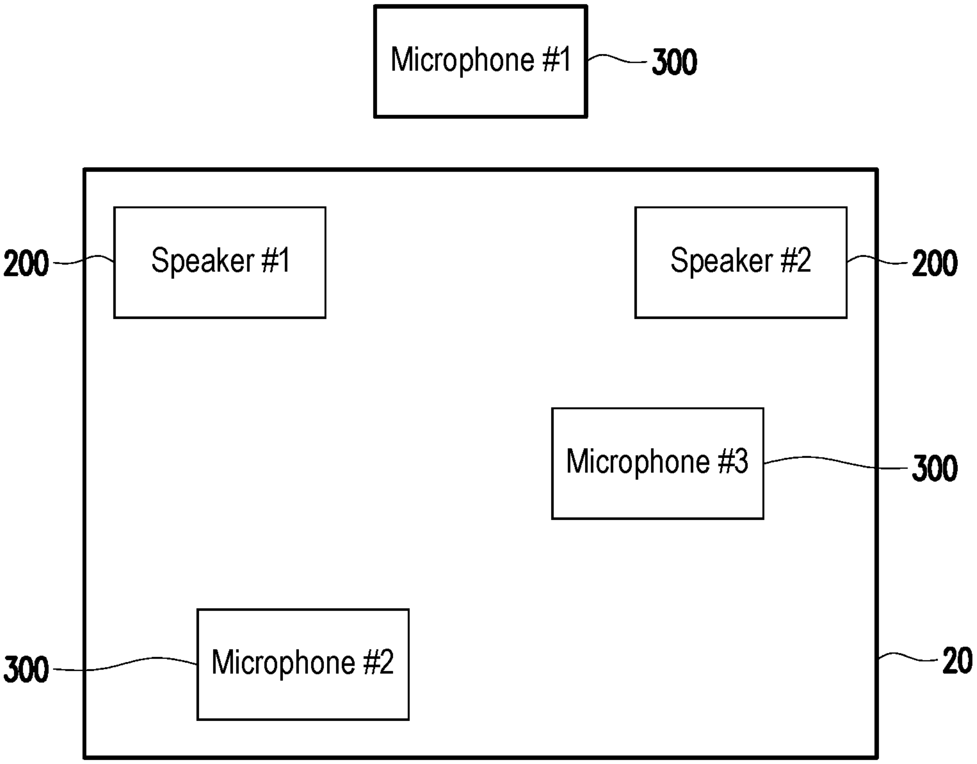
FIG. 4 is a schematic diagram illustrating a second scenario of the field according to an embodiment of the invention.

In an embodiment, the controller 100 may calculate a propagation delay according to the distance between the speaker 200 and the microphone #k, and define the propagation delay as the time delay between the speaker 200 and the microphone #k, where the propagation delay is equal to the distance divided by the speed of sound (for example: 340 m/s). Taking FIG. 4 as an example, FIG. 4 is a schematic diagram illustrating a second scenario of the field 20 according to an embodiment of the invention. In the second scenario, the microphone #1 is not in the field 20, i.e., the speechmaker may conduct a conference remotely. When the speechmaker speaks, the microphone #1 may obtain the sound wave, and transmit an audio signal corresponding to the sound wave to the controller 100 through the Internet. The controller 100 may output the audio signal to the microphone #2 through the speaker #1 and the speaker #2. The controller 100 may calculate the propagation delay from the speaker #1 to the microphone #2 according to the distance between the microphone #2 and the speaker #1, and set the propagation delay as a time delay D(2,1). The controller 100 may calculate the propagation delay from the speaker #2 to the microphone #2 according to the distance between the microphone #2 and the speaker #2, and set the propagation delay as a time delay D(2,2). In this way, the controller 100 may obtain the time delay D(2)=[D(2,1) D(2,2)] corresponding to the microphone #2. On the other hand, the controller 100 may output the audio signals to the microphone #3 through the speaker #1 and the speaker #2. The controller 100 may calculate the propagation delay from the speaker #1 to the microphone #3 according to the distance between the microphone #3 and the speaker #1, and set the propagation delay as a time delay D(3,1). The controller 100 may calculate the propagation delay from the speaker #2 to the microphone #3 according to the distance between the microphone #3 and the speaker #2, and set the propagation delay as a time delay D(3,2). In this way, the controller 100 may obtain the time delay D(3)=[D(3,1) D(3,2)] corresponding to the microphone #3. Accordingly, the transmission delay of the Internet may be prevented from seriously affecting a value of the time delay D(2) or D(3).

In step S204, the controller 100 may execute calculation of the optimization algorithm according to the output power SPK(i) of each speaker 200, the volume MIC(j) of the audio signal received by each microphone 300 and the time delay D(k) of each microphone 300 to obtain a recommended output power and a recommended output delay corresponding to each speaker 200.

In an embodiment, the controller 100 may execute calculation of a dynamic causal Bayesian optimization (DCBO) algorithm to obtain the recommended output power and the recommended output delay corresponding to each speaker 200, as shown in formula (1), where $$\sum_{j=2}^{M}(T-MIC(j))^2/(M-1)$$

represents an objective function of the DCBO algorithm, SPK(i) represents an output power of the speaker #i in the N speakers 200, MIC(j) represents a volume corresponding to the microphone #j in the M microphones 300, D(k) represents a time delay of the microphone #k in the M microphones 300, and T represents a reference volume (for example: 70 dB). In an embodiment, the formula (1) may further include constraints TH1<SPK(i)<TH2 and TH3<D(k)<TH4, where TH1 represents a lower limit of the output power of the speaker 200 (for example: the output power of making the speaker 200 to output a sound of 20 decibels), TH2 represents an upper limit of the output power of the speaker 200 (for example: the output power of making the speaker 200 to output a sound of 80 decibels), TH3 represents a lower limit of the time delay of the speaker 200 (for example: 0.01 second), and TH4 represents an upper limit value of the time delay of the speaker 200 (for example: 0.08 second).

$$\underset{\{SPK(1),\ldots,SPK(N),D(2),\ldots,D(M)\}}{\arg\min}\frac{\sum_{j=2}^{M}(T-MIC(j))^2}{(M-1)} \tag{1}$$

$$\text{subject to: }\begin{cases}TH1<SPK(i)<TH2, & i=1,2,\ldots N\\ TH3<D(k)<TH4, & k=2,3,\ldots,M\end{cases}$$

The objective function of the formula (1) is to make the volume of the audio signal received by each microphone 300 as close as possible to the reference volume. The reference volume may be a customized value. In an embodiment, a reference volume T may be equal to the volume of the sound wave received by the microphone #1, so that the volume of the sound heard by the audience is consistent with the volume of the sound produced by the speechmaker. The output power SPK(i)' satisfying the formula (1) is the recommended output power corresponding to the speaker #i, and the time delay D(k)' satisfying the formula (1) is the recommended time delay corresponding to microphone #k. The recommended time delay D(k)'=[D(k,1)' D(k,2)' . . . . D(k,N)'], where D(k,i)' represents the recommended time delay between the microphone #k and the speaker #i. The recommended time delay D(k,i)' may include the output delay of the speaker #i itself plus the propagation delay P(i,k) between the speaker #i and the microphone #k. Accordingly, the controller 100 may calculate the recommended output delay RD(i) corresponding to the speaker #i according to formula (2).

$$RD(i)=D(k,i)'-P(i,k),\ k\in\{2,3,\ldots,M\},\ i\in\{1,2,\ldots,N\} \tag{2}$$

Figure 5:
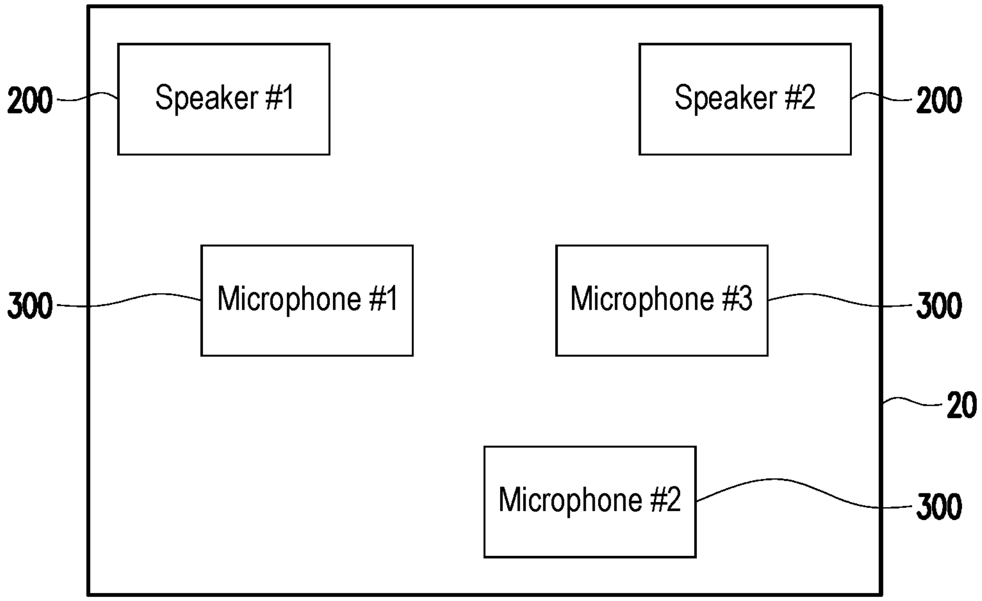
FIG. 5 is a schematic diagram of the field changing from the first scenario to a third scenario according to an embodiment of the invention.

Taking FIG. 5 as an example, the controller 100 may produce a recommended delay time D(2)'=[D(2,1)'=0.07 seconds D(2,2)'=0.04 seconds] corresponding to the microphone #2 and a recommended delay time D(3)'=[D(3,1)'=0.06 seconds D(3,2)'=0.03 seconds] corresponding to the microphone #3 based on the formula (1) according to the output power SPK(1) of the speaker #1, the output power SPK(2) of the speaker #2, the time delay D(2)=[D(2,1) D(2,2)] of the microphone #2 and the time delay D(3)=[D(3,1) D(3,2)] of the microphone #3. If the propagation delay P(1,2) between the microphone #2 and the speaker #1 is 0.03 seconds, the controller 100 may calculate the recommended output delay RD(1) corresponding to the speaker #1 to be equal to D(2,1)'−P(1,2)=0.04 seconds based on the formula (2). Optionally, if the propagation delay P(1,3) between the microphone #3 and the speaker #1 is 0.02 seconds, the controller 100 may calculate the recommended output delay RD(1) corresponding to the speaker #1 to be equal to D(3,1)'−P(1,3)=0.04 seconds based on the formula (2). On the other hand, if the propagation delay P(2,2) between the microphone #2 and the speaker #2 is 0.02 seconds, the controller 100 may calculate the recommended output delay RD(2) corresponding to the speaker #2 to be equal to D(2,2)'−P(2,2)=0.02 seconds based on the formula (2). Optionally, if the propagation delay P(2,3) between the microphone #3 and the speaker #2 is 0.01 seconds, the controller 100 may calculate the recommended output delay RD(2) corresponding to the speaker #2 to be equal to D(3,2)'−P(2,3)=0.02 seconds based on the formula (2).

In an embodiment, the controller 100 may perform a calculation based on the DCBO algorithm to further obtain a recommended input volume corresponding to each microphone 300, as shown in formula (3), where $$\sum_{j=2}^{M}(T-MIC(j))^2/(M-1)$$

represents the objective function of the DCBO algorithm, SPK(i) represents the output power of the speaker #i in the N speakers 200, and MIC(j) represents the volume corresponding to the microphone #j in the M microphones 300, D(k) represents the time delay of the microphone #k in the M microphones 300, and T represents the reference volume. In an embodiment, formula (3) may further include constraints TH1<SPK(i)<TH2 and TH3<D(k)<TH4, where TH1 represents the lower limit of the output power of the speaker 200, TH2 represents the upper limit of the output power of the speaker 200, TH3 represents the lower limit of the time delay of the speaker 200, and TH4 represents the upper limit of the time delay of the speaker 200.

$$\underset{\{SPK(1),\ldots,SPK(N),MIC(1),\ldots,MIC(M),D(2),\ldots,D(M)\}}{\arg\min}\ \frac{\sum_{j=2}^{M}(T-MIC(j))^2}{(M-1)} \tag{3}$$

$$\text{subject to: }\begin{cases} TH1 < SPK(i) < TH2, & i=1,2,\ldots N \\ TH3 < D(k) < TH4, & k=2,3,\ldots,M \end{cases}$$

The volume MIC(j)' satisfying the formula (3) is the recommended input volume corresponding to the microphone #j. The controller 100 may control sensitivity (unit: mV/Pa) of the microphone #j according to a voltage (unit: mV) so that the volume of the audio signal received by the microphone #j meets the recommended input volume.

In an embodiment, the controller 100 may perform calculation based on the DCBO algorithm to further obtain recommended positions corresponding to each microphone 300 and each speaker 200, as shown in formula (4), where $$\sum_{j=2}^{M}(T-MIC(j))^2/(M-1)$$

represents the objective function of the DCBO algorithm, SPK(i) represents the output power of the speaker #i in the N speakers 200, MIC(j) represents the volume corresponding to the microphone #j in the M microphones 300, D(k) represents the time delay of the microphone #k in the M microphones 300, T represents the reference volume, C(i) represents coordinates of the speaker #i in the field 20, and c(j) represents coordinates of the microphone #j in the field 20. In an embodiment, the formula (4) may further include constraints TH1<SPK(i)<TH2 and TH3<D(k)<TH4, where TH1 represents the lower limit of the output power of the speaker 200, TH2 represents the upper limit of the output power of the speaker 200, TH3 represents the lower limit of the time delay of the speaker 200, and TH4 represents the upper limit of the time delay of the speaker 200.

$$\underset{\{SPK(1),\ldots,SPK(N),MIC(1),\ldots,MIC(M),D(2),\ldots,D(M),C(1),\ldots,C(N),c(1),\ldots,c(M)\}}{\arg\min}\ \frac{\sum_{j=2}^{M}(T-MIC(j))^2}{(M-1)} \tag{4}$$

$$\text{subject to: }\begin{cases} TH1 < SPK(i) < TH2, & i=1,2,\ldots N \\ TH3 < D(k) < TH4, & k=2,3,\ldots,M \end{cases}$$

The coordinate C(i)' satisfying the formula (4) is the recommended position corresponding to the speaker #i, and the coordinate c(j)' satisfying the formula (4) is the recommended position corresponding to the microphone #j. An organizer of the conference may move the position of each speaker 200 or microphone 300 in the field 20 according to the optimization result of the formula (4).

In step S205, the controller 100 may configure the output power of the speaker 200 according to the recommended output power of the speaker 200, so that the audio signal heard by each listener has a similar volume. In an embodiment, the controller 100 may further configure the output delay of the speaker 200 according to the recommended output delay of the speaker 200, so as to reduce the interference of echo to the conference, and also make the audio volume heard by the audience similar.

The output power SPK(i), the volume MIC(j) and the time delay D(k) in formula (1) or formula (3) may be changed along with time. For example, the output power SPK(i) may be changed by factors such as speaker aging, environmental humidity or voltage, etc.; the volume MIC(j) may be changed by factors such as microphone aging, environmental humidity or temperature, etc.; and the time delay D(k) may be changed by factors such as speaker aging, air temperature or air density, etc. In order to maintain the best experience of the conference participants, in an embodiment, the controller 100 may repeatedly execute the process shown in FIG. 2 as time changes, so as to dynamically configure the output powers and output delays of the speakers 200. Taking FIG. 5 as an example, FIG. 5 is a schematic diagram of the field 20 changing from the first scenario to the third scenario according to an embodiment of the invention. If the listener holding the microphone #2 moves to a different position in the field 20, the volume MIC(2) of the audio signal received by the microphone #2 and the time delay D(2) of the microphone #2 may both be changed. Accordingly, the controller 100 may execute the calculation of optimization algorithm according to the changed volume MIC(2) and time delay D(2), and then update the recommended output power and recommended output delay corresponding to each speaker 200.

Figure 6:
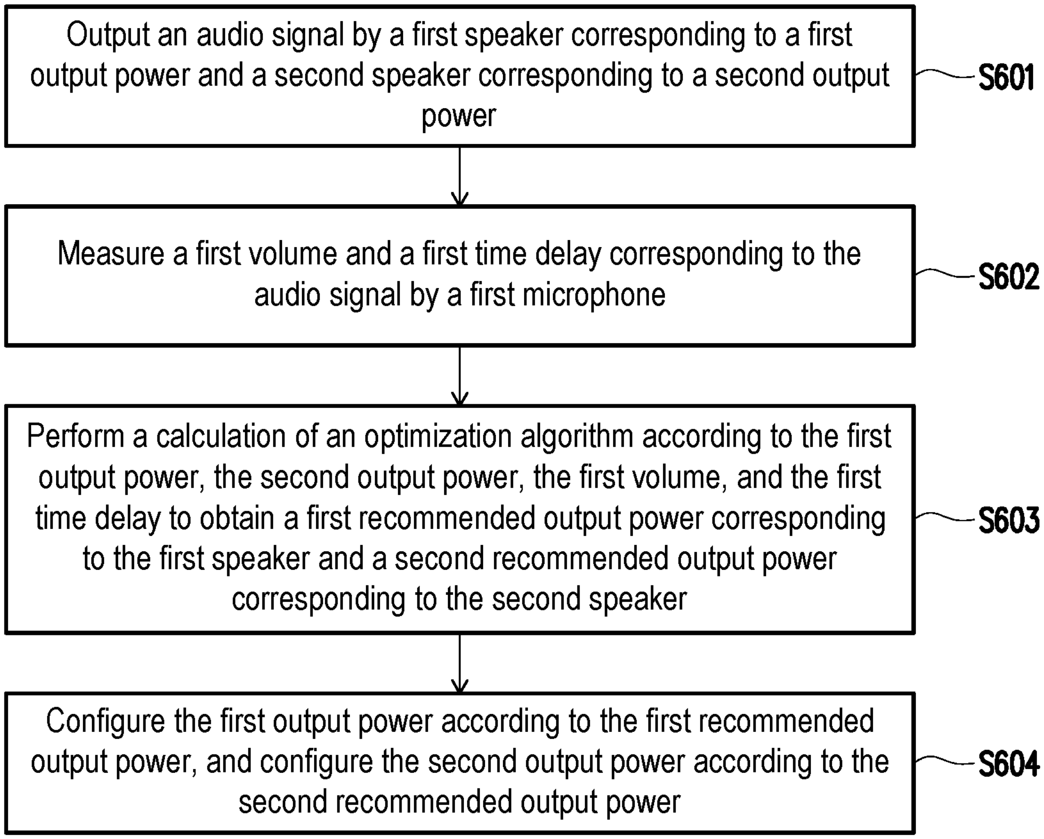
FIG. 6 is a flowchart of a control method for speakers in a field according to an embodiment of the invention.

FIG. 6 is a flowchart of a control method for speakers in a field according to an embodiment of the invention, where the control method may be implemented by the control system 10 shown in FIG. 1. In step S601, an audio signal is output by a first speaker corresponding to a first output power and a second speaker corresponding to a second output power. In step S602, a first volume and a first time delay corresponding to the audio signal are measured through a first microphone. In step S603, calculation of an optimization algorithm is performed according to the first output power, the second output power, the first volume and the first time delay to obtain a first recommended output power corresponding to the first speaker and a second recommended output power corresponding to the second speaker. In step S604, the first output power is configured according to the first recommended output power, and the second output power is configured according to the second recommended output power.

In summary, the control system of the invention may obtain the parameter (such as the output power) of each speaker and the parameter (such as the volume and the time delay) of each microphone in the field, perform optimization on these parameters, and configure the output power and output delay of each speaker according to the optimization result. Therefore, the control system may make the sound heard by each audience in the field to have a similar volume, and may reduce the interference of echoes to the conference, thereby improving fluency and efficiency of the conference.

What is claimed is:

1. A control system for a speaker in a field, comprising:

a first speaker corresponding to a first output power;

a second speaker corresponding to a second output power;

a first microphone; and a controller communicatively connected to the first speaker, the second speaker, and the first microphone, wherein the controller is configured to:

output an audio signal by the first speaker and the second speaker;

measure a first volume and a first time delay corresponding to the audio signal by the first microphone;

perform a calculation of a dynamic optimization algorithm according to the first output power, the second output power, the first volume, and the first time delay to obtain a first recommended output power corresponding to the first speaker and a second recommended output power corresponding to the second speaker, wherein the dynamic optimization algorithm that uses the first output power, the second output power, the first volume, and the first time delay as dynamic input parameters, wherein the dynamic input parameters are changed along with time; and configure the first output power according to the first recommended output power, and configure the second output power according to the second recommended output power.

2. The control system as claimed in claim 1, wherein the dynamic optimization algorithm comprises a dynamic causal Bayesian optimization algorithm.

3. The control system as claimed in claim 2, wherein an objective function of the dynamic causal Bayesian optimization algorithm comprises a mean square error of a reference volume and the first volume.

4. The control system as claimed in claim 2, further comprising:

a second microphone communicatively connected to the controller, wherein the second microphone obtains a sound wave corresponding to a second volume, wherein an objective function of the dynamic causal Bayesian optimization algorithm comprises a mean square error of the second volume and the first volume.

5. The control system as claimed in claim 2, wherein constraints of the dynamic causal Bayesian optimization algorithm comprise an upper limit and a lower limit of the first recommended output power and an upper limit and a lower limit of the second recommended output power.

6. The control system as claimed in claim 1, wherein the first speaker outputs the audio signal at a first time point, and the first microphone receives the audio signal at a second time point, wherein the controller is further configured to:

calculate a difference between the second time point and the first time point to obtain the first time delay.

7. The control system as claimed in claim 1, wherein the controller is further configured to:

perform the calculation of the dynamic optimization algorithm according to the first output power, the second output power, the first volume and the first time delay to obtain a recommended time delay corresponding to the first speaker;

calculate a propagation delay according to a distance between the first speaker and the first microphone;

subtract the propagation delay from the recommended time delay to obtain a recommended output delay; and configure an output delay of the first speaker according to the recommended output delay.

8. The control system as claimed in claim 7, wherein the controller is further configured to:

output a first audio signal by the first speaker, and output a second audio signal by the second speaker;

measure a first propagation time of the first audio signal from the first speaker to the first microphone by the first microphone, and measure a second propagation time of the second audio signal from the second speaker to the first microphone by the first microphone;

generate first positioning information of the first microphone according to a first position of the first speaker, the first propagation time, a second position of the second speaker, and the second propagation time; and calculate the distance according to the first positioning information.

9. The control system as claimed in claim 7, wherein the first microphone comprises a first transceiver, and the controller is further configured to:

transmit at least one reference signal;

receive the at least one reference signal by the first transceiver to measure a positioning parameter of the first microphone; and calculate the distance according to the positioning parameter.

10. The control system as claimed in claim 9, wherein the controller is further configured to:

execute an ultra-wideband positioning method, an enhanced cell identification positioning method or a time difference of arrival measurement method according to the positioning parameter to generate positioning information of the first microphone; and calculate the distance according to the positioning information of the first microphone.

11. A control method for a speaker in a field, comprising:

outputting an audio signal by a first speaker corresponding to a first output power and a second speaker corresponding to a second output power;

measuring a first volume and a first time delay corresponding to the audio signal by a first microphone;

performing a calculation of a dynamic optimization algorithm according to the first output power, the second output power, the first volume, and the first time delay to obtain a first recommended output power corresponding to the first speaker and a second recommended output power corresponding to the second speaker, wherein the dynamic optimization algorithm that uses the first output power, the second output power, the first volume, and the first time delay as dynamic input parameters, wherein the dynamic input parameters are changed along with time; and configuring the first output power according to the first recommended output power, and configuring the second output power according to the second recommended output power.

12. The control method as claimed in claim 11, wherein the dynamic optimization algorithm comprises a dynamic causal Bayesian optimization algorithm.

13. The control method as claimed in claim 12, wherein an objective function of the dynamic causal Bayesian optimization algorithm comprises a mean square error of a reference volume and the first volume.

14. The control method as claimed in claim 12, further comprising:

obtaining a sound wave corresponding to a second volume by a second microphone, wherein an objective function of the dynamic causal Bayesian optimization algorithm comprises a mean square error of the second volume and the first volume.

15. The control method as claimed in claim 12, wherein constraints of the dynamic causal Bayesian optimization algorithm comprise an upper limit and a lower limit of the first recommended output power and an upper limit and a lower limit of the second recommended output power.

16. The control method as claimed in claim 11, wherein the first speaker outputs the audio signal at a first time point, and the first microphone receives the audio signal at a second time point, wherein the control method further comprises:

calculating a difference between the second time point and the first time point to obtain the first time delay.

17. The control method as claimed in claim 11, further comprising:

performing the calculation of the dynamic optimization algorithm according to the first output power, the second output power, the first volume and the first time delay to obtain a recommended time delay corresponding to the first speaker;

calculating a propagation delay according to a distance between the first speaker and the first microphone;

subtracting the propagation delay from the recommended time delay to obtain a recommended output delay; and configuring an output delay of the first speaker according to the recommended output delay.

18. The control method as claimed in claim 17, further comprising:

outputting a first audio signal by the first speaker, and outputting a second audio signal by the second speaker;

measuring a first propagation time of the first audio signal from the first speaker to the first microphone by the first microphone, and measuring a second propagation time of the second audio signal from the second speaker to the first microphone by the first microphone;

generating first positioning information of the first microphone according to a first position of the first speaker, the first propagation time, a second position of the second speaker, and the second propagation time; and calculating the distance according to the first positioning information.

19. The control method as claimed in claim 17, further comprising:

transmitting at least one reference signal;

receiving the at least one reference signal by the first microphone to measure a positioning parameter of the first microphone; and calculating the distance according to the positioning parameter.

20. The control method as claimed in claim 19, further comprising:

executing an ultra-wideband positioning method, an enhanced cell identification positioning method or a time difference of arrival measurement method according to the positioning parameter to generate positioning information of the first microphone; and calculating the distance according to the positioning information of the first microphone.

* * * * *